United States Patent [19]

Fado et al.

[11] Patent Number: 5,438,275
[45] Date of Patent: Aug. 1, 1995

[54] DIGITIZING STYLUS HAVING CAPACITIVE PRESSURE AND CONTACT SENSING CAPABILITIES

[75] Inventors: Francis Fado, Highland Beach; Tin-Lup Wong; Guy F. Verrier, both of Boca Raton, all of Fla.; Robert L. Donaldson, Annapolis; Paul D. Kowalewski, Severna Park, both of Md.

[73] Assignee: International Business Machines Inc., Armonk, N.Y.

[21] Appl. No.: 177,106

[22] Filed: Jan. 3, 1994

[51] Int. Cl.[6] .......................................... G01R 27/26
[52] U.S. Cl. .................................. 324/662; 324/686; 324/690; 324/71.1
[58] Field of Search ............... 324/661, 662, 686, 690, 324/71.1; 73/865.4, 862.626; 361/181, 283.1, 283.2, 283.3

[56] References Cited

U.S. PATENT DOCUMENTS

| | | | |
|---|---|---|---|
| 4,096,758 | 6/1978 | Moore | 324/661 X |
| 4,322,977 | 4/1982 | Sell et al. | 324/662 X |
| 4,498,043 | 2/1985 | Heathcote et al. | 324/662 |
| 4,672,154 | 6/1987 | Rodgers et al. | |
| 4,786,765 | 11/1988 | Yamanami et al. | |
| 5,206,785 | 4/1993 | Hukashima | 361/283.2 |

Primary Examiner—Kenneth A. Wieder
Assistant Examiner—Diep Do
Attorney, Agent, or Firm—Martin J. McKinley; David L. McCombs; Paul T. Kashimba

[57] ABSTRACT

A stylus assembly in which a stylus is mounted in a housing for movement relative thereto. An electrical circuit is provided for sensing contact of the stylus with a writing surface and measuring the pressure exerted on the surface by the stylus.

7 Claims, 1 Drawing Sheet

DIGITIZING STYLUS HAVING CAPACITIVE PRESSURE AND CONTACT SENSING CAPABILITIES

BACKGROUND OF THE INVENTION

This invention relates to a digitizer stylus assembly and, more particularly, to such an assembly in which contact with, and pressure exerted on, a writing surface is sensed and measured for use in connection with portable computing devices, or the like.

As computers become smaller and more portable, small hand-held computers, such as "pen" or "pad" computers, have evolved which enable the user to "write" on the computer by applying an active digitizer stylus, which is part of a digitizing subassembly, to a digitized surface on the face or screen of the pad or tablet.

In these arrangements, is often important to detect the status of the stylus relative to the surface and, more particularly, whether or not the stylus is engaging the surface preparatory to initiating the writing. Also, some software responds to different pressures exerted on the stylus as a result of pressing the stylus on the surface to perform various functions, such as to detect handwriting, change images on the screen, etc.

Some prior assemblies that utilize pressure sensing for active styli in this art incorporate a switch in the stylus tip to detect stylus contact with the digitizer surface. However, these switches are used only to detect stylus contact but cannot measure stylus tip pressure.

Other assemblies of this type utilize a force sensing resistor device associated with the stylus to measure pressure. However, these devices suffer from wide variations in their accuracy and do not allow for accurate control of the pressure range, linearity, sensitivity and granularity.

SUMMARY OF THE INVENTION

It is therefore an object of the present invention to provide a digitizer stylus assembly in which initial contact and pressures exerted on a surface by a stylus are sensed and measured.

It is a further object of the present invention to provide a assembly of the above type in which the stylus is an active digitizer stylus adapted for writing on a digitizer surface utilizing an active stylus.

It is a further object of the present invention to provide an assembly of the above type which enables the pressure range, as well as the linearity, sensitivity and granularity to be accurately controlled.

It is a still further object of the present invention to provide an assembly of the above type in which optimum performance and reliable and accurate measurements are continuous over a relatively large range.

Towards the fulfillment of the these and other objects the assembly of the present invention features a stylus mounted in a housing for movement relative thereto in response to pressure exerted by the stylus on a writing surface. An electrical circuit is provided for responding to the stylus contacting the surface and to the pressure exerted on the surface by the stylus.

BRIEF DESCRIPTION OF THE DRAWINGS

The above description, as well as further objects, features and advantages of the present invention will be more fully appreciated by reference to the following detailed description of the presently preferred, but nonetheless illustrative, embodiments in accordance with the present invention when taken in conjunction with the accompanying drawings in which.

DESCRIPTION OF THE ILLUSTRATIVE EMBODIMENTS

Figure 1:
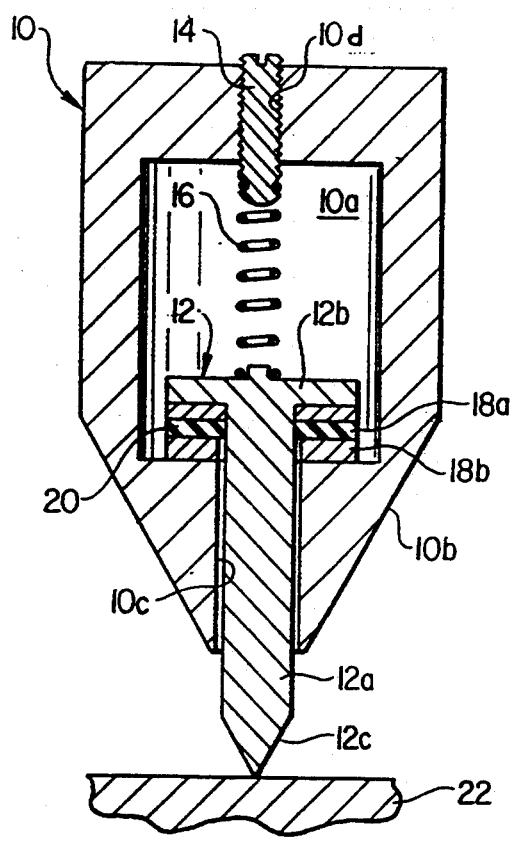
FIG. 1 is a cross-sectional view of the assembly of the present invention depicting the stylus of the assembly in initial engagement with the digitizer surface.

FIG. 1 of the drawings depicts the assembly of the present invention which includes a hollow stylus barrel 10 of circular cross-section having a center chamber 10a and a conical tip 10b. A bore, or passage, 10c extends through the tip 10b and connects the chamber 10a to the distal end of the tip, and a threaded bore 10d extends through the upper wall of the barrel 10. Although not shown in the drawings, it is understood that the barrel 10 can be connected to a shaft, or stem, of a pen by affixing the upper end of the barrel to the shaft, in a conventional manner.

A stylus 12 has a cylindrical stem 12a, a portion of which extends in the bore 10c of the barrel 10, with the outer diameter of the stem being slightly less than the diameter of the bore, to permit axial movement of the stem relative to the bore. The upper portion of the stem 12, as viewed in FIG. 1, extends above the bore 10c and into the chamber 10a and a circular flange 12b extends from the upper end of the stem. A portion of the stem 12a projects downwardly from the lower end of the bore 10c of the barrel 10 and a conical tip 12c is formed on the lower end of the stem.

A threaded bolt 14 extends in the bore 10d of the barrel 10 so that rotation of the bolt varies its axial position relative to the chamber 10a. A mechanical spring 16 is disposed in the chamber 10a and extends between the upper end of the stem 12a of the stylus 12 and the lower end of the bolt 14 and can be affixed to both in any conventional manner. Thus, rotation of the bolt 14 causes corresponding axial movement of same and varies the compression of the spring 16, in a conventional manner.

Two spaced, parallel capacitor plates, or discs, 18a and 18b are disposed in the chamber 10a and are affixed, in any known manner, to the lower surface of the flange 12b of the stylus 12 and to the upper, inner surface of that portion of the barrel defining the chamber 10a, respectively. A dielectric plate 20 is affixed to the lower surface of the plate 18a to insulate the latter plate from the plate 18b and thus form a capacitor. The plates 18a, 18b and 20 are circular and each has a central opening through which the stylus stem 12a extends. Thus, movement of the stem 12a, and therefore the plate 18a (and the plate 20), varies the capacitance across the plates 18a and 18b when the latter are connected in an electrical circuit, as will be described.

Normally the stylus 12 is in the position shown in FIG. 1 in which the spring 16 forces it, and therefore the flange 12a, the plate 18a and the dielectric plate 20 downwardly until the plate 20 engages the plate 18b. It can be appreciated that, in this position, the spacing between, and the capacitance across, the plates 18a and 18b attain a finite value.

Figure 2:
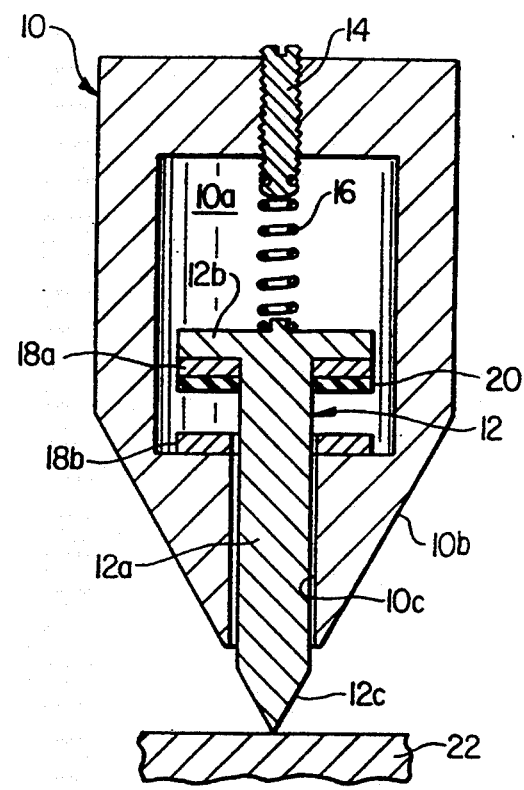
FIG. 2 is a view similar to FIG. 1, but depicting the stylus after being subjected to an additional pressure to cause movement of the stylus relative to its barrel.

When the stylus tip 12c is pressed against a surface, such as a digitized surface shown partially by the reference numeral 22 in FIG. 1, and forming a screen of a computer, the reactive force causes an upwardly-directed pressure to be applied against the stylus which, when sufficient to overcome the force of the spring 16, causes the stylus to move upwardly in the barrel 10. This causes a corresponding upward movement of the plate 18a (and the plate 20) relative to the plate 18b to a position shown, by way of example, in FIG. 2. The degree of this movement is dependent on the force, or pressure, exerted on the surface 22 by the stylus tip 12c in excess of that applied to the stylus 12 by the spring 16.

Figure 3:
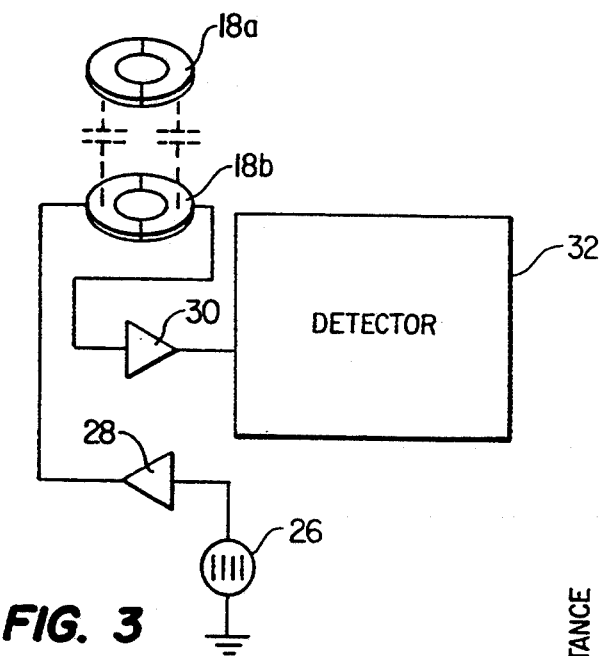
FIG. 3 is an electrical circuit of the assembly of the present invention.

The movement of the plate 18a away from the plate 18b causes a corresponding reduction in the capacitance across the plates 18a and 18b which is detected and measured with the circuitry shown in FIG. 3. More particularly, the two plates 18a and 18b are connected in a circuit including a signal generator 26 connected, by an amplifier 28, to one side of the fixed plate 18b. The plates 18a and 18b, in effect form two parallel capacitors as shown in dashed lines, whose values vary with movement of the plate 18a relative to the plate 18b as described above. The other side of the plate 18b is connected, via an amplifier 30, to a detector 32 which operates in a conventional manner to provide an output signal corresponding to the capacitance, or to the variation in capacitance, caused by movement of the plate 18a.

Thus, a predetermined capacitance is established in the rest position of FIG. 1, which capacitance varies upon contact of the stylus tip 12c with the surface 22 at a sufficient pressure to cause movement of the stylus against the force of the spring 16 and corresponding movement of the plate 18a relative to the plate 18b. Of course the capacitance varies further as additional pressure is applied to the stylus tip against the latter surface. This variation in capacitance is measured and translated to a value by the circuitry of FIG. 3 which corresponds to the pressure exerted on the stylus 12.

In a digitizing environment the detector 32 would include a pre-amplifier and an integrator which measures and samples the capacitance in the circuit over a period of time and provides a "hold" analog signal. An analog-to-digital converter would also be provided to digitize the analog signal from the detector. The detector 32, and its associated componentry would be mounted on the barrel 10 and the digitized signal would be transmitted, via a wireless communication system (not shown) to a digitizer located in the pad or tablet for responding to the digitized signal. Since the specifics of the detector, the integrator, the converter, and the transmission system are conventional and do not form a part of the present invention, they will not be described in any further detail.

Figure 4:
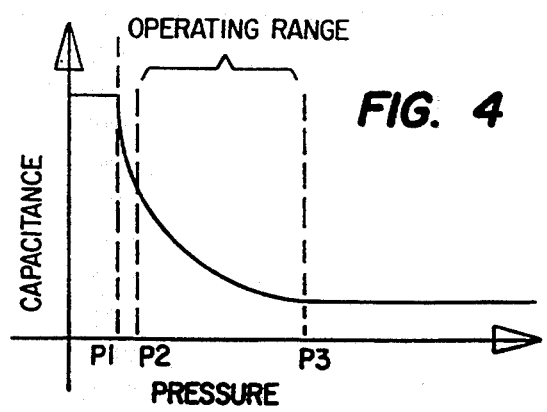
FIG. 4 is a graph depicting the sensitivity of the assembly of the present invention over its operating range.

With reference to FIG. 4, which depicts the relationship between pressure and the resulting capacitance determined by the circuit of FIG. 3, it is noted that the change in pressure on the stylus 12, and the resultant change in capacitance across the plates 18a and 18b, is non-linear. More particularly, the point P1 designates the pre-load pressure (and corresponding capacitance), while the point P2 shows the pressure at contact and the point P3 shows the pressure when the plate 20 contacts the plate 18b to establish the at-rest, fixed capacitance.

Thus, higher sensitivity is used to accurately detect contact, while the lower sensitivity is present in the less critical portions of the pressure range after contact. Of course, by rotating the bolt 14 relative to the barrel 10, and thus varying the compression on the spring 16, the initial contact pressure threshold, as well as the operating range of the assembly can be varied.

The assembly of the present invention thus offers several advantages. For example, the pressure range, as well as the linearity, sensitivity and granularity are accurately controlled. Also, optimum performance is achieved over a relative large pressure range. Also, reliable and accurate indications of pressure are continuous over the entire pressure range. Further, the force applied by the spring 16 is adjustable to enable the initial contact pressure threshold, and the operating range to be adjusted.

It is understood that several variations can be made in the foregoing without departing from the scope of the invention. For example the assembly of the present invention is not limited to the use of a capacitor in the manner described but can be applied to any other variable reactive component, such as an inductor.

Other variations are intended in the foregoing disclosure, and in some instances some features of the invention will be employed without a corresponding use of other features. Accordingly, it is appropriate that the appended claims be construed broadly and in a manner consistent with the scope of the invention.

What is claimed is:

1. An assembly for sensing pressure applied to a contact surface, said assembly comprising:
   a housing;
   a stylus mounted in said housing for movement relative thereto;
   an electrical circuit associated with at least one of said housing and said stylus for detecting and quantifying pressure exerted on said stylus as a result of said stylus engaging said contact surface, said electrical circuit comprising a capacitor having one plate mounted on said stylus and another plate mounted on said housing so that movement of said stylus as a result of said stylus engaging said contact surface varies a capacitance of said capacitor;
   spring means normally applying a predetermined pressure against said one capacitor plate to urge said one capacitor plate in a direction towards said other capacitor plate and opposite the direction of said pressure exerted on said stylus by said contact surface; and
   means for varying said predetermined pressure on said spring to vary an initial contact threshold and an operating range of said electrical circuit.

2. The assembly of claim 1 wherein said electrical circuit comprises means responsive to movement of said stylus relative to said housing for generating an output signal.

3. The assembly of claim 2 wherein said movement responsive means comprises a variable reactive component associated with one of said housing and said stylus.

4. The assembly of claim 3 wherein said variable reactive component is a capacitor having one plate mounted on said stylus and another plate mounted on said housing so that movement of said stylus as a result of said stylus engaging said contact surface varies a capacitance of said capacitor.

5. The assembly of claim 4 further comprising spring means normally applying a predetermined pressure against said one capacitor plate to urge said one capacitor plate in a direction towards said other capacitor plate and opposite the direction of said pressure exerted on said stylus by said contact surface.

6. The assembly of claim 5 wherein said spring means urges said one capacitor plate to a predetermined position relative to said other plate to establish a finite capacitance between said plates, said movement of said one plate varying said capacitance.

7. The assembly of claim 1 wherein said housing has a circular cross section, and wherein said stylus is coaxially disposed in said housing and is adapted for movement along the axis of said housing.

* * * * *